US009672012B2

(12) United States Patent
Kizhakkevalappil et al.

(10) Patent No.: US 9,672,012 B2
(45) Date of Patent: *Jun. 6, 2017

(54) CODE VALIDATION USING CONTENT ASSIST

(71) Applicant: International Business Machines Corporation, Armonk, NY (US)

(72) Inventors: Jayanand Kizhakkevalappil, Burnaby (CA); Tejas R. Parajia, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,229

(22) Filed: Jan. 4, 2016

(65) Prior Publication Data

US 2016/0117150 A1    Apr. 28, 2016

Related U.S. Application Data

(63) Continuation of application No. 13/760,441, filed on Feb. 6, 2013, now Pat. No. 9,262,130.

(30) Foreign Application Priority Data

Apr. 5, 2012   (CA) ..................... 2773721

(51) Int. Cl.
G06F 9/44       (2006.01)
G06F 9/45       (2006.01)
G06F 11/36      (2006.01)

(52) U.S. Cl.
CPC ............... G06F 8/33 (2013.01); G06F 8/34 (2013.01); G06F 8/433 (2013.01); G06F 11/3696 (2013.01)

(58) Field of Classification Search
USPC .................................................. 717/168–178
See application file for complete search history.

(56) References Cited

U.S. PATENT DOCUMENTS 6,311,323 B1 * 10/2001 Shulman et al. ............. 717/111
6,314,559 B1 * 11/2001 Sollich .......................... 717/111

(Continued)

OTHER PUBLICATIONS

Watson et al.; An Integrated Approach to Improving the Parallel Application Development Process; IEEE International Symposium on Parallel & Distributed Processing; May 23-29, 2009; 8 pages.

(Continued)

*Primary Examiner* — Matthew Brophy
(74) *Attorney, Agent, or Firm* — Schmeiser, Olsen & Watts, LLP; John Pivnichny

(57) ABSTRACT

A process and associated system for code validation using content assist. A first list of items is presented to a code developer who is writing software code during operation of a content assist in an integrated development environment (IDE). Each item of the first list of items is enabled for validation and is a function or code method which generates a result upon being executed. An item selected by the developer from the first list of items is received during the operation of the content assist. A result for the selected item is generated by (i) executing the selected item using at least one value received as input from the developer during the operation of the content assist and (ii) ascertaining whether executing the selected item requires prior initialization of a value of a variable. During the operation of the content assist, the result is displayed to the developer.

20 Claims, 11 Drawing Sheets

(56) References Cited

U.S. PATENT DOCUMENTS

| | | | |
|---|---|---|---|
| 7,313,784 B2* | 12/2007 | Hawley | G06F 8/33 717/106 |
| 7,373,634 B2 | 5/2008 | Hawley et al. | |
| 7,562,343 B2* | 7/2009 | Hawley | G06F 8/33 717/109 |
| 7,562,344 B1* | 7/2009 | Allen | G06F 8/33 717/100 |
| 7,650,592 B2 | 1/2010 | Eckels et al. | |
| 7,761,843 B2* | 7/2010 | Ortscheid | G06F 8/33 717/106 |
| 7,865,477 B2 | 1/2011 | Larcheveque | |
| 7,865,870 B2 | 1/2011 | Gunturi et al. | |
| 7,917,894 B2 | 3/2011 | Chen et al. | |
| 8,051,408 B1* | 11/2011 | Johnson | G06F 8/33 715/705 |
| 8,091,068 B2 | 1/2012 | Hawley | |
| 8,266,585 B2* | 9/2012 | Funt | G06F 8/33 717/106 |
| 8,307,333 B2* | 11/2012 | Peterson | G06F 8/33 717/110 |
| 8,307,334 B2* | 11/2012 | Peterson | G06F 8/33 717/110 |
| 8,307,335 B2* | 11/2012 | Hutchison | G06F 8/33 717/110 |
| 8,667,456 B1* | 3/2014 | Czymontek | G06F 8/315 707/696 |
| 8,776,010 B2* | 7/2014 | Fisher | G06F 8/33 717/100 |
| 8,869,097 B2* | 10/2014 | Asadullah et al. | 717/103 |
| 9,116,672 B2 | 8/2015 | Muir | |
| 9,239,708 B2* | 1/2016 | Tillmann | G06F 8/33 |
| 9,383,973 B2* | 7/2016 | Villar | G06F 8/33 |
| 2005/0240984 A1 | 10/2005 | Farr et al. | |
| 2005/0278695 A1* | 12/2005 | Synovic | 717/112 |
| 2006/0026559 A1* | 2/2006 | Gunturi et al. | 717/110 |
| 2006/0130038 A1* | 6/2006 | Claussen et al. | 717/168 |
| 2007/0288867 A1 | 12/2007 | Gunturi et al. | |
| 2008/0098352 A1* | 4/2008 | Hawley et al. | 717/109 |
| 2008/0295085 A1 | 11/2008 | Rachamadugu | |
| 2008/0320438 A1 | 12/2008 | Funto | |
| 2009/0222789 A1* | 9/2009 | Frank et al. | 717/104 |
| 2010/0017786 A1 | 1/2010 | Hutchison | |
| 2010/0017790 A1 | 1/2010 | Hutchison | |
| 2010/0083218 A1 | 4/2010 | Bender | |
| 2011/0035729 A1 | 2/2011 | Sakhare et al. | |
| 2011/0040852 A1* | 2/2011 | Sakhare | 709/219 |
| 2011/0113407 A1* | 5/2011 | Mariani et al. | 717/130 |
| 2011/0271250 A1* | 11/2011 | Park et al. | 717/113 |
| 2011/0271258 A1* | 11/2011 | Park et al. | 717/127 |
| 2013/0268912 A1 | 10/2013 | Kizhakkevalappil et al. | |

OTHER PUBLICATIONS

Salvaneschi et al; JavaCTX: Seamless Toolchain Integration for Context-Oriented Programming; Cornell University Library; Apr. 7, 2011; 16 pages.

Office Action (Mar. 26, 2015) for U.S. Appl. No. 13/760,441, filed Feb. 6, 2013.

Amendment (Jun. 25, 2015) for U.S. Appl. No. 13/760,441, filed Feb. 6, 2013.

Notice of Allowance (Oct. 16, 2015) for U.S. Appl. No. 13/760,441, filed Feb. 6, 2013.

* cited by examiner

```
if (eupgSegment.getOperatingCarrier() !=null && eupgSegment.getOperatingFlightNumber() !=null) { if (eupgSegment.getOperatingFlightNumber() . trim() . equalsIgnoreCase (flightSegmentSDO. getOperatingFlight Info () . g
&& DateTimeUtil. convertISODateToDDMMYY(flightSegmentSDO.getDepartureDateTime() ) .equals (DateTimeUtil. convertDa
&& DateTimeUtil.convertDateTo ┌─ convertDateToDateString(Date date) String - DateTimeUtil
                                                                    │  convertDateToddMMyyyy(Date date) String - DateTimeUtil        ┐
                                                                    │  convertDateToDDMMYyyy(Date date) String - DateTimeUtil        │
                                                                    │  convertDateToDDMMYyyy(Date date) String - DateTimeUtil        │
            segmentID = eupgSegment.g                                │  convertDateToDDMMYYYYHHmm(Date date) String - DateTimeUtil    │
                                                                    │  convertDateToDDMMY(Date date) String - DateTimeUtil           │─404
         }                                                           │  convertDateToHHmm(Date date) String· DateTimeUtil            │
      }                                                              │  convertDateToHHmmWithOutColon(Date date) String - DateTimeUtil│
   }                                                                 │  convertDateToISODate(Date date) String - DateTimeUtil        ┘
                                                                    │  convertDateToMMDDYYYY(Date date) String - DateTimeUtil        ┐
eturn segmentId;      402                                           │  convertDateToMMDDYYYYHHmm(Date date) String - DateTimeUtil    │
                                                                    │ ┌convertDateToddMMYYYY(Date date) String - DateTimeUtil validate│ 
                                                                    │ └                                                              │
aran dbsegment   CONTEXT MENU THAT  408                             │  convertDateToDDMMYYYY(Date date) String - DateTimeUtil validate│─406
eturn            IS ADDED THAT                                      │  convertDateToDDMMYYYYHHmm(Date date) String - DateTimeUtil validate│
                 ALLOWS VALIDATION                                  │  convertDateToHHmm(Date date) String - DateTimeUtil validate   │
te Boolean hasAnyBoundXSegmentAssociatio                            │  convertDateToHHmmWithOutColon(Date date) String - DateTimeUtil validate│
oolean flightXSegmentExists=false                                   │  convertDateToISODate(Date date) String - DateTimeUtil validate│
                                                                    └  convertDateToMMDDYYYY(Date date) String· DateTimeUtil validate┘ ist<EupgBoundSEupgSegment> eupgBoundSeg
```

FIG. 4

```
if (eupgSegment.getOperatingCarrier() !=null && eupgSegment.getOperatingFlightNumber() !=null) {
    if (eupgSegment.getOperatingFlightNumber().trim().equalsIgnoreCase(flightSegmentSDO.getOperatingFlightInfo().g
    && DateTimeUtil.convertISODateToDDMMYY(flightSegmentSDO.getDepartureDateTime()).equals(DateTimeUtil.convertDa
    && DateTimeUtil.convertDateTo
    }
} segmentID = eupgSegment.g     ● convertDateToDateString(Date date) String - DateTimeUtil
                              ● convertDateToddMMMyyyy(Date date) String - DateTimeUtil          ─ 404
                              ● convertDateToddMMMYYYY(Date date) String - DateTimeUtil
}                             ● convertDateToddMMyyyy(Date date) String - DateTimeUtil
                              ● convertDateToDDMMyyyy(Date date) String - DateTimeUtil
                              ● convertDateToDDMMYYYYHHmm(Date date) String - DateTimeUtil
eturn segmentId;              ● convertDateToDDMYY(Date date) String - DateTimeUtil
eturn                         ● convertDateToHHmm(Date date) String• DateTimeUtil
                              ● convertDateToHHmmWithOutColon(Date date) String - DateTimeUtil
                              ● convertDateToISODate(Date date) String - DateTimeUtil
                              ● convertDateToMMDDYYYY(Date date) String - DateTimeUtil
                              ● convertDateToMMDDYYYYHHmm(Date date) String - DateTimeUtil
aram dbsegment  SELECTED CONTEXT MENU 408  ● convertDateToddMMYYYY(Date date) String - DateTimeUtil validate
eturn                         ┌──────────────────────────────┐
olean flightXSegmentExists=false   │ DAY  [ 8 ▲▼]                 │
                              │ MONTH [December ▼] YEAR [2010 ▲▼] TIME [8:16:56PM] │ ─ 406
ist<EupgBoundSEupgSegment> eupgBoundSeg  │                              │
          AN INTROSPECTED POPUP    └──────────────────────────────┘
          THAT ALLOWS FIELD VALUES 502  ● convertDateToHHmmWithOutColon(Date date) String - DateTimeUtil validate
          TO BE ENTERED           ● convertDateToISODate(Date date) String - DateTimeUtil validate
                                  ● convertDateToMMDDYYYY(Date date) String• DateTimeUtil validate
```

```
if (eupgSegment.getOperatingCarrier () !=null && eupgSegment.getOperatingFlightNumber () !=null) {
    if (eupgSegment. getOperatingF lightNumber () . trim () . equalsIgnoreCase (flightSegmentSDO. getOperatingFlight Info () . g
    && DateTimeUtil.convertISODateToDDMMYY(flightSegmentSDO.getDepartureDateTime ()) .equals (DateTimeUtil. convertDa
    && DateTimeUtil.convertDateTo
```

- convertDateToDateString(Date date) String - DateTimeUtil
- convertDateToddMMMyyyy(Date date) String - DateTimeUtil
- convertDateToDDMMyyyy(Date date) String - DateTimeUtil
- convertDateToDDMMYYYY(Date date) String - DateTimeUtil
- convertDateToDDMMYYYYHHmm(Date date) String - DateTimeUtil
- convertDateToDDMMYY(Date date) String - DateTimeUtil
- convertDateToHHmm(Date date) String· DateTimeUtil
- convertDateToHHmmWithOutColon(Date date) String - DateTimeUtil
- convertDateToMDDYYYY(Date date) String - DateTimeUtil
- convertDateToMDDYYYYHHmm(Date date) String - DateTimeUtil
- compareTo (Date date) int - DateTimeUtil validate Please enter currentDate value:

DAY 8   MONTH December   YEAR 2010   TIME 8:16:56PM

- convertDateToISODate(Date date) String - DateTimeUtil validate
- convertDateToMDDYYYY(Date date) String· DateTimeUtil validate

FIG. 8

```
if (eupgSegment.getOperatingCarrier() !=null && eupgSegment.getOperatingFlightNumber() !=null) {
    if (eupgSegment.getOperatingFlightNumber().trim().equalsIgnoreCase(flightSegmentSDO.getOperatingFlight Info().g
    && DateTimeUtil.convertISODateToDDMMYY(flightSegmentSDO.getDepartureDateTime()).equals(DateTimeUtil.convertDa
    && DateTimeUtil.convertDateTo
```

- convertDateToDateString(Date date) String - DateTimeUtil
- convertDateToddMMyyyy(Date date) String - DateTimeUtil
- convertDateToddMMYYYY(Date date) String - DateTimeUtil
- convertDateToDDMMYYYY(Date date) String - DateTimeUtil
- convertDateToDDMMYYYYHHmm(Date date) String - DateTimeUtil
- convertDateToDDMMYY(Date date) String - DateTimeUtil
- convertDateToHHmm(Date date) String· DateTimeUtil
- convertDateToHHmmWithOutColon(Date date) String - DateTimeUtil
- convertDateToISODate(Date date) String - DateTimeUtil
- convertDateToMMDDYYYY(Date date) String - DateTimeUtil
- convertDateToMMDDYYYYHHmm(Date date) String - DateTimeUtil
- convertDateToMMDDYYYY(Date date) String - DateTimeUtil
- compareTo(Date date) int - DateTimeUtil validate

```
    }
}
eturn segmentId;
eturn aram dbsegment
eturn te Boolean hasAnyBoundXSegmentAssociatio
oolean flightXSegmentExists=false ist<EupgBoundSEupgSegment> eupgBoundSeg
```

- convertDateToHHmmWithOutColon(Date date) String - DateTimeUtil validate
- convertDateToISODate(Date date) String - DateTimeUtil validate
- convertDateToMMDDYYYY(Date date) String· DateTimeUtil validate DAY 8
MONTH December  YEAR 2010  TIME 8:16:56 PM SELECTED CONTEXT MENU 802
AN INTROSPECTED POPUP THAT ALLOWS FIELD VALUES 502 TO BE ENTERED

FIG. 9

```
if (eupgSegment.getOperatingCarrier() !=null && eupgSegment.getOperatingFlightNumber() !=null) {
    if (eupgSegment.getOperatingFlightNumber().trim().equalsIgnoreCase(flightSegmentSDO.getOperatingFlight Info().g
    && DateTimeUtil.convertISODateToDMMYY(flightSegmentSDO.getDepartureDateTime()).equals(DateTimeUtil.convertDa
    && DateTimeUtil.convertDateTo
    } segmentID = eupgSegment.g
} eturn segmentId;

aram dbsegment
eturn te Boolean hasAnyBoundXSegmentAssociatio
oolean flightXSegmentExists=false ist<EupgBoundEupgSegment> eupgBoundSeg
```

- convertDateToDateString(Date date) String – DateTimeUtil
- convertDateToddMMyyyy(Date date) String – DateTimeUtil
- convertDateToddMMMyyyy(Date date) String – DateTimeUtil
- convertDateToDDMMyyyy(Date date) String – DateTimeUtil
- convertDateToDDMMYYYHHmm(Date date) String – DateTimeUtil
- convertDateToDDMMYY(Date date) String – DateTimeUtil
- convertDateToHHmm(Date date) String* DateTimeUtil
- convertDateToHHmmWithOutColon(Date date) String – DateTimeUtil
- convertDateToISODate(Date date) String – DateTimeUtil
- convertDateToMMDDYYYY(Date date) String – DateTimeUtil
- convertDateToMMDDYYYYHHmm(Date date) String – DateTimeUtil
- convertDateToMMDDYYYYHHmm(Date date) String – DateTimeUtil
- compareTo(Date date) int – DateTimeUtil validate

— 404

SELECTED CONTEXT MENU —802

AN INTROSPECTED POPUP
THAT ALLOWS FIELD VALUES —502
TO BE ENTERED

DAY 8
MONTH December   YEAR 2010
RESULT IS: 08DEC2010 —1002
TIME 8:16:56 PM

DISPLAY OF RESULTS
AT RUN TIME ALONG
WITH OTHER INFORMATION

Expected execution time : 5 ms : Memory Usage : 3034 Bytes —1004
Alternate API suggestion : NIL —1006

- convertDateToMMDDYYYY(Date date) String* DateTimeUtil validate

CODE VALIDATION USING CONTENT ASSIST

This application is a continuation application claiming priority to Ser. No. 13/760,441, filed Feb. 6, 2013, now U.S. Pat. No. 9,262,130, issued Feb. 16, 2016.

TECHNICAL FIELD

This disclosure relates generally to evaluating expressions in a data processing system and more specifically to validation of an expression in the data processing system.

BACKGROUND

Developers coding a program typically want to evaluate an expression or a function that is external to the program being coded and resides in another program or a utility application-programming interface (API). Typically determining which method or version of a set of methods may include guesswork.

For example, the developer uses a date time conversion utility created by fellow programmers. In the application code, the developer is using CurrentDate which is in a known ISO format in the following code statement:
  DateTimeUtil.convertISODateToDDMMMYY(CurrentDate);
The utility DateTimeUtil has a number of overloaded methods similar to the example code statement including the following:
  #1 public static string convertISODateToDDMMMYY (Date ISODate);
  #2 public static string convertISODateToDDMMYY (String ISODate);
  #3 public static int convertISODateToDDMMMYY(Date ISODate); and
  #4 public static date convertISODateToDDMMMYY (Date ISODate);
Each of the example methods yields a different outcome depending on the requirement. The developer therefore has to traverse the documentation to determine which method suits a specific requirement, or review the DateTimeUtil code to identify the result generated per the requirement.

Using the technique referenced in the example to identify behavior of the method is typically error prone and non-productive.

BRIEF SUMMARY

The present invention provides a process and associated system for code validation using content assist. The process comprises:

presenting, to a code developer by one or more processors of a data processing system, a first list of items, said first list of items presented to the developer who is writing software code during operation of a content assist in an integrated development environment (IDE) of the data processing system, said developer enabled by the content assist to write the software code faster during the operation of the content assist than without the content assist, each item of the first list of items being enabled for validation, each item of the first list of items being a function or code method which generates a result upon being executed by the one or more processors;

said one or more processors receiving, during the operation of the content assist, an item selected by the developer from the first list of items;

said one or more processors identifying, during the operation of the content assist, an input object associated with the selected item;

said one or more processors receiving from the developer, during the operation of the content assist, at least one input value for execution of selected item;

said one or more processors generating, during the operation of the content assist, a result for the selected item by executing the selected item using the received at least one value as input for said executing; and said one or more processors displaying, during the operation of the content assist, the result to the developer.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

FIG. 4 is a textual representation of a code snippet of a self-contained function in accordance with one embodiment of the disclosure.

FIG. 5 is a textual representation of entering a value for a self-contained function in accordance with one embodiment of the disclosure.

FIG. 6 is a textual representation of a code snippet of a response for a self-contained function in accordance with one embodiment of the disclosure.

FIG. 7 is a textual representation of a code snippet of a function requiring initialization in accordance with one embodiment of the disclosure.

FIG. 8 is a textual representation of a code snippet of entering a value for a function requiring initialization in accordance with one embodiment of the disclosure.

FIG. 9 is a textual representation of a code snippet of entering a value for a function requiring initialization in accordance with one embodiment of the disclosure.

FIG. 10 is a textual representation of a code snippet of a response for a function requiring initialization in accordance with one embodiment of the disclosure.

DETAILED DESCRIPTION

Figure 1:
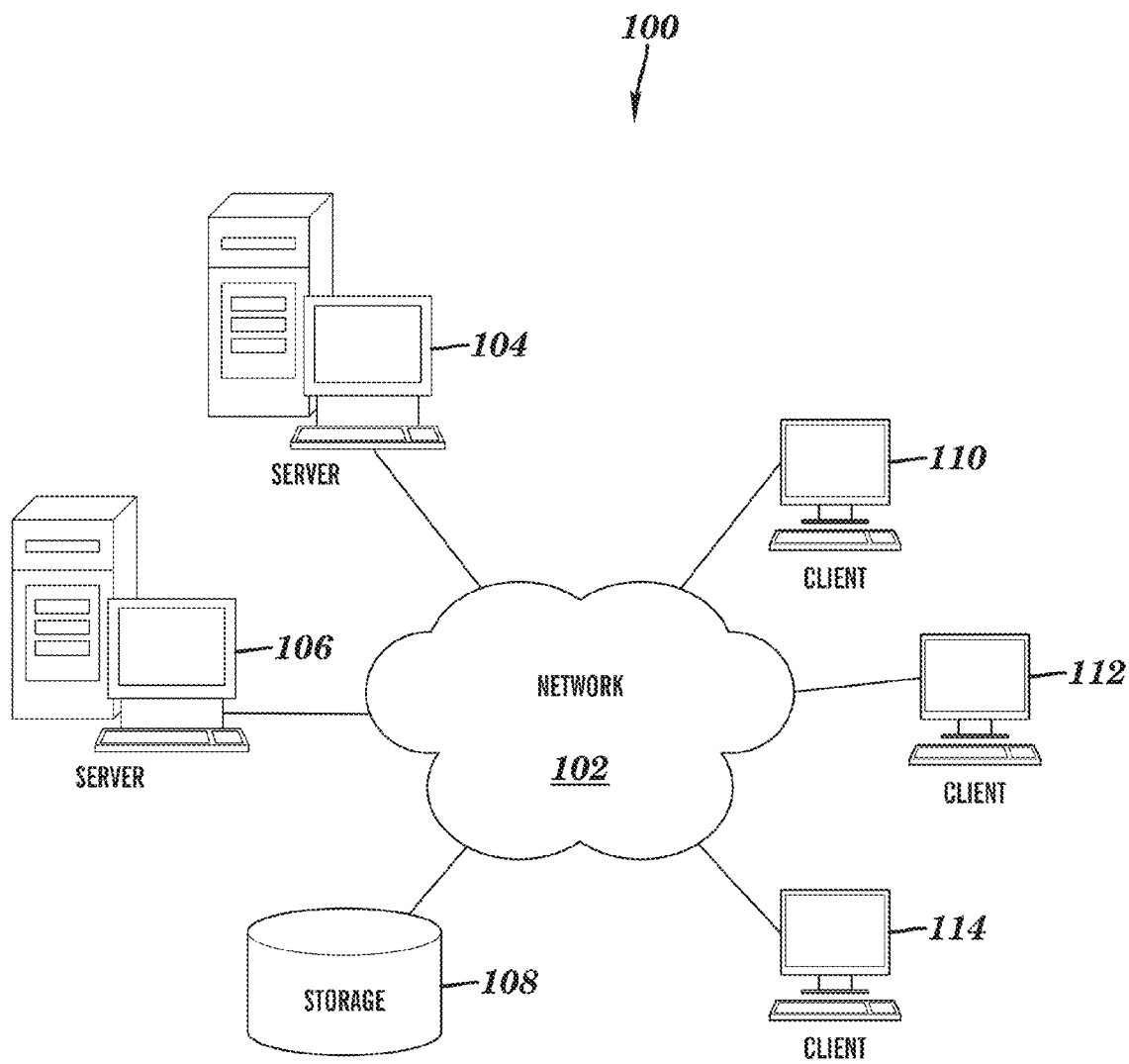
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

For methods that yield a different outcome depending on the requirement, the present invention uses a technique of content assist which is a function of some integrated development environments (IDE) which helps the developer write code typically faster and more efficiently than without the content assist. The content assist may provide the developer with a list of accessible keywords according to a programming language specification, variable, methods, or data types. The content assist may be exemplified in the form of autocomplete, for example, wherein predefined keywords are supplied or a specific structure such as a tabular format applied, for a selected code element. In another example, the content assist may provide values from a database to populate the content assist itself and then a portion of the created code is inserted into a file.

According to one embodiment, a computer-implemented process for validating an expression, presents a set of items, wherein each item in the set of items having an expression option enabled for validation, to a requester, receives a selected item in the set of items from the requester, and determines whether initialization is needed for the selected item. Responsive to a determination that initialization is not needed for the selected item, the process identifies an input object associated with the selected item, receives values for the identified input object, and generates a result for the selected item using the received values for the identified input object in real time. The computer-implemented process presents the result to the requester in real time.

According to another embodiment, a computer program product for validating an expression comprises a computer recordable-type media containing computer executable program code stored thereon. The computer executable program code comprises computer executable program code for presenting a set of items, wherein each item in the set of items has an expression option enabled for validation, to a requester, computer executable program code for receiving a selected item in the set of items having an expression option enabled for validation from the requester, computer executable program code for determining whether initialization is needed for the selected item, computer executable program code responsive to a determination that initialization is not needed for the selected item, for identifying an input object associated with the selected item, computer executable program code for receiving values for the identified input object, computer executable program code for generating a result for the selected item using the received values for the identified input object in real time, and computer executable program code for presenting the result to the requester in real time.

According to another embodiment, an apparatus for validating an expression, comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to present a set of items, wherein each item in the set of items has an expression option enabled for validation, to a requester, receive a selected item in the set of items having an expression option enabled for validation from the requester, determine whether initialization is needed for the selected item, responsive to a determination that initialization is not needed for the selected item, identify an input object associated with the selected item, receive values for the identified input object, generate a result for the selected item using the received values for the identified input object in real time, and present the result to the requester in real time.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable storage medium (e.g., a hardware storage device) or a computer-readable signal medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, radio frequency (RF), or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
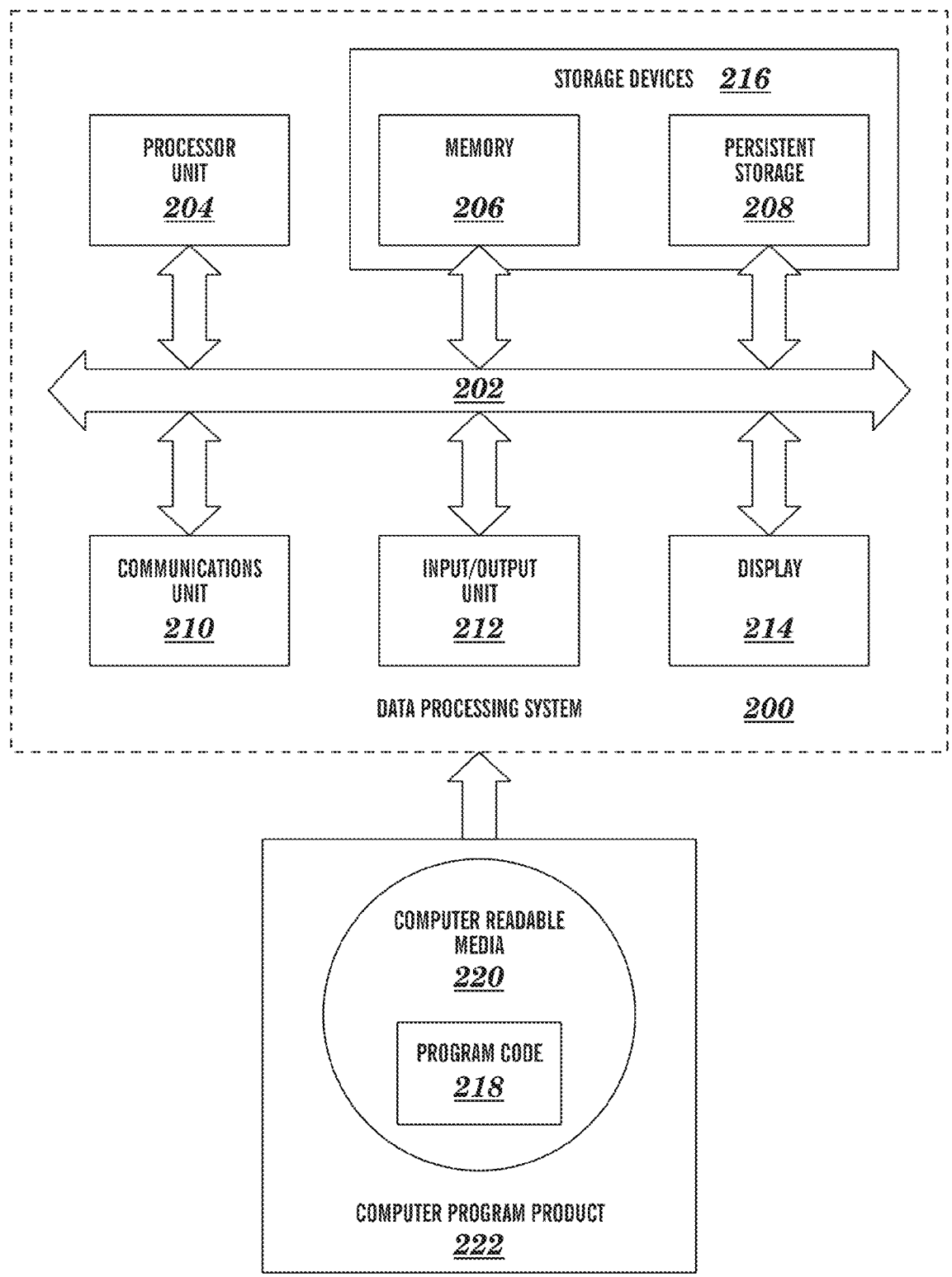
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type. Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. Thus, the data processing system may comprise one or more processors, a memory coupled to the processor, and a computer readable storage device coupled to the processor, wherein the storage device contains program code, which upon being executed by the one or more processors via the memory, implements the methods of the present invention.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208. Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples The computer program product may comprise a computer readable tangible storage medium (e.g., hardware storage device) having computer readable program code stored therein. The program code, upon being executed by one or more processors of a computer system, implements the methods of the present invention.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Typically expediting the development process, reducing or eliminating errors and improving productivity, is achieved when using embodiments of the disclosed process. An embodiment of the disclosed process provides a capability in the form of an enhanced content assist feature in the integrated development environment (IDE) to enable validation of an expression and to return responses of functions/methods during content assist or during the completion of content assist thus enabling the developer to select a correct method/function according to use.

In one embodiment, the content/code assist feature of the present invention presents to the code developer: (a) internal functions/methods in the current code/software that the code developer is developing; and (b) external functions/methods in other external programs or application-programming interfaces (APIs) being referenced or used in the current code/software being developed. Both the internal and external functions/methods may be displayed or otherwise presented to the code developer in a list of items. Each item of the list of items may be enabled for validation.

Using an embodiment of the disclosed process with the previous example the developer is prompted to indicate whether to validate the function/method as one of the options of content assist. Alternatively, the need to indicate could be added as a context menu to a section of code selected. When the developer chooses to validate, a set of editable fields are appended to a content assist dialog in which the developer is able specify input data, and responses from the validation are shown as a separate dialog/call out or in a different view. Additionally, a suggestion feature, which stores results of a function/method evaluated on starting of the IDE or stored in a historical memory, allows the developer to choose from an alternate of the function/method based on performance criteria, including memory footprint, and execution time. Based on the responses received, the developer chooses to proceed with a function/method suiting the requirement. An illustrative embodiment thus provides an option added in a content assist to validate a portion of code at programming time. The illustrative embodiment further includes an introspected object, using a user interface (UI), enables developers to add literal values as input to the code validation. Results are displayed using the UI instantly at the time of validation. The display of results typically includes information comprising expected execution time and memory footprint used by the validated function. Optionally the display of information further comprises a suggestion of an alternative function that produces the same results while delivering better performance or is preferred according to other associated criteria.

Using data processing system 200 of FIG. 2 as an example, a computer-implemented process for code validation using content assist is presented. Processor unit 204 presents a set of items, for example, in an integrated development environment, from storage devices 216, using display 214, wherein each item in the set of items having an expression option enabled for validation, to a requester, and receives a selected item in the set of items having an expression option enabled for validation from the requester using communications unit 210, input/output unit 212 or display 214. Processor unit 204 further determines whether initialization is needed for the selected item and responsive to a determination that initialization is not needed for the selected item, identifies an input object associated with the selected item, and receives values for the identified input object. Processor unit 204 generates a result for the selected item using the received values for the identified input object in real time and presents the result to the requester in real time using display 214.

Figure 3:
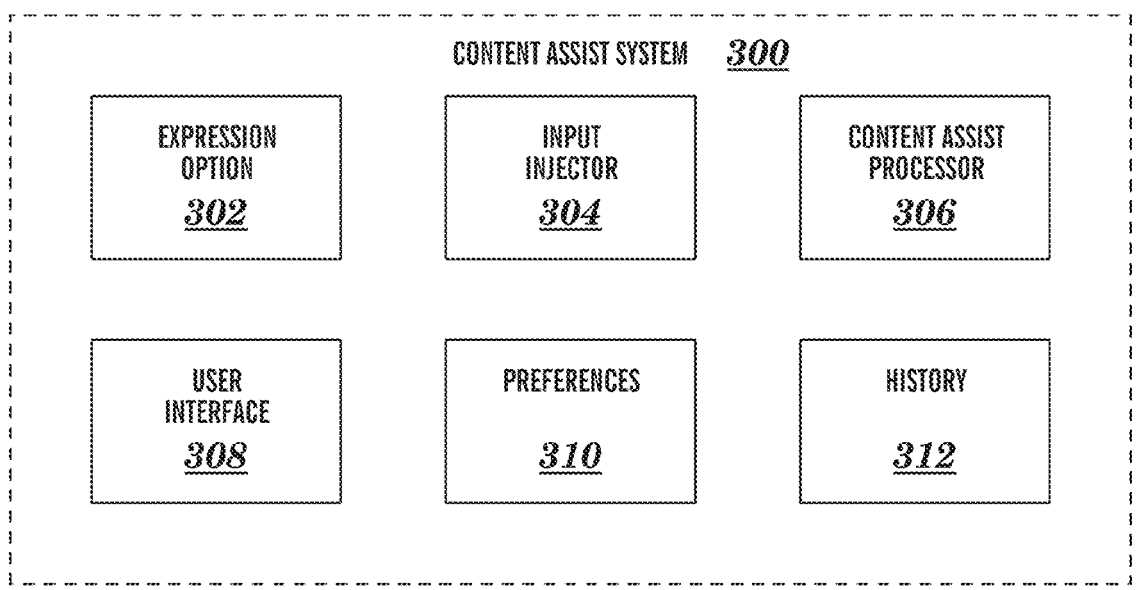
FIG. 3 is a block diagram representation of a content assist system operable for various embodiments of the disclosure.

With reference to FIG. 3 a block diagram of a content assist system operable for various embodiments of the disclosure is presented. Content assist system 300 is an example of enhanced content assist comprising a number of components including expression option 302, input injector 304, content assist processor 306, user interface 308, preferences 310 and history 312. Throughout the disclosure the terms function and method may be used interchangeably.

Content assist system 300 leverages typical support services of an underlying data processing system such as network data processing system 100 of FIG. 1 or data processing system 200 of FIG. 2. The components, in the example, of content assist system 300 of FIG. 3 may either be implemented as a set of logically separate components, a set of physically separate components or a combination thereof without affecting the function of the defined functions. In the example embodiment of the disclosure, content assist system 300 is a collection of capabilities embedded in an integrated development environment forming a combination representing an enhanced integrated development environment. In an alternate embodiment of the disclosure, content assist system 300 may be implemented as a set of capabilities leveraging support of an underlying data processing system with programmatic access to components such as a run-time (rather than the previously provided example using the integrated development environment) to deliver the described set of capabilities without a loss of capabilities.

Expression option 302 provides a capability of enabling content assist to validate a portion of code at programming time. Expression option 302 may be implemented through provision of a prompt indicating whether a validate operation associated with a function/method is available as an option of content assist. Rather than a prompt, another embodiment enables the need to indicate in the form of a context menu associated with a section of code selected; for example, selecting a date compare function in which a version of the function includes a validate requirement from a set of statements in user interface 308 including regular functions and corresponding validate versions of the functions.

Input injector 304 provides a capability of an introspected object enabling a developer to add literal values as input to a selected function for code validation. Input injector 304 provides a capability to dynamically obtain values, externally, for parameters of the selected function being validated. For example, a prompt associated with the introspected object requests values for parameters requiring input information before processing of the validation operation by content assist processor 306. The required values may be provided by a developer or in another embodiment by a response file or database lookup. In one embodiment, preferences 310 provides properties or attributes used to control the behavior of processing, such as providing default values for functions which cannot provide the values or to enable the functions to be evaluated without the developer input.

Content assist processor 306 provides a capability of executing a selected function using appropriate input values in real time. The results provided from the processing are available at the time of validation. Processing, when required, includes initialization of any non-initialized variables requiring initialization to perform a subsequent evaluation of the selected function.

User interface 308 provides a capability of visual interaction with a user enabling the user to input required values for a selected function and to display results generated by content assist processor 306. User interface 308 displays results in real time as a separate dialog or callout or a different view from that of the view used to obtain input. The display of results may optionally include alternative functions for the selected function. The alternative functions typically provide the same results as the selected function but deliver improvement according to specific criteria (the criteria may be provided using preferences 310 or in a dialog with the user).

Preferences 310 provide a capability to control behavior of processing in content assist system 300. Preferences 310 enable establishment of customizable properties including default values for supported functions for which validation is desired, and storage locations for temporary and persistent data (such as history of function specific field values). For example, a preference provides a default base date value for injection into a date related function. In another example, a preference indicates a report output providing a list of the top three alternatives according to execution time or memory usage.

Using preferences 310 provide a mechanism for programmatic operation of content assist system 300 without developer interaction to perform programmatic injection of values into a respective function under evaluation. Preferences 310 provide a capability to address injection on multiple levels of user interface and data files. For example, in an embodiment of content assist system 300, operation is performed in the background for a predetermined group of functions to generate results for each respective function wherein the results are summarized as a list of alternate functions, from which a preferred candidate is selected using a predetermined selection criteria and presented to a requester. In an embodiment using the report output providing a list of alternatives, a dialog presents the list of alternatives generated in the background, to the developer according to a ranking using the execution time or memory usage. In this manner scripts may be used to evaluate and validate several similar functions.

History 312 provides a capability to store values associated with a function or the same value used across functions. The stored values comprise values including input values (for example, preferences) as well as output values. When used for storing output values, storage enables retrieval and calculation operations upon the saved values including ranking and sorting as may be used when compiling a ranked list of alternatives. History 312 is accordingly a data structure created and managed by content assist system 300.

With reference to FIG. 4 a textual representation of a code snippet of a self-contained function in accordance with one embodiment of the disclosure is presented. Code snippet 400 is an example of using content assist system 300 of FIG. 3 in one embodiment. The self-contained function of the example requires no external initialization.

Code snippet 400 provides an example of using a date and time utility which is portrayed in a dialog 402 exposing a set of methods 404. Each method in set of methods 404 is a regular method, which was implemented prior to enhanced content assist of content assist system 300. A set of enhanced methods 406 provides versions of corresponding methods of set of methods 404 which have been enhanced to include support for a validate operation in the form of context menu 408. A user selects a method for validation using the context menu.

With reference to FIG. 5 a textual representation of entering a value for a self-contained function in accordance with one embodiment of the disclosure is presented. Code snippet 500 is a continuation of the example of code snippet 400 of FIG. 4.

Code snippet 500 contains the information previously described in the explanation of code snippet 400 with the addition of a dialog. Popup 502 provides a capability for the user to input required field values for the selected function being validated. On selection of the method with validate option the developer is enabled to enter a value of the date object on the same dialog or a separate dialog. The input object, that is the date object, is identified through introspection, for example, Java reflection. The input values entered are used to validate the function and to yield a response instantly at programming time, as in real time. The dialog and values associated with the method vary with the needs of the function and method being validated. The values may be provided dynamically by the user of the dialog or using data contained in preferences 310 of FIG. 3.

Figure 6:
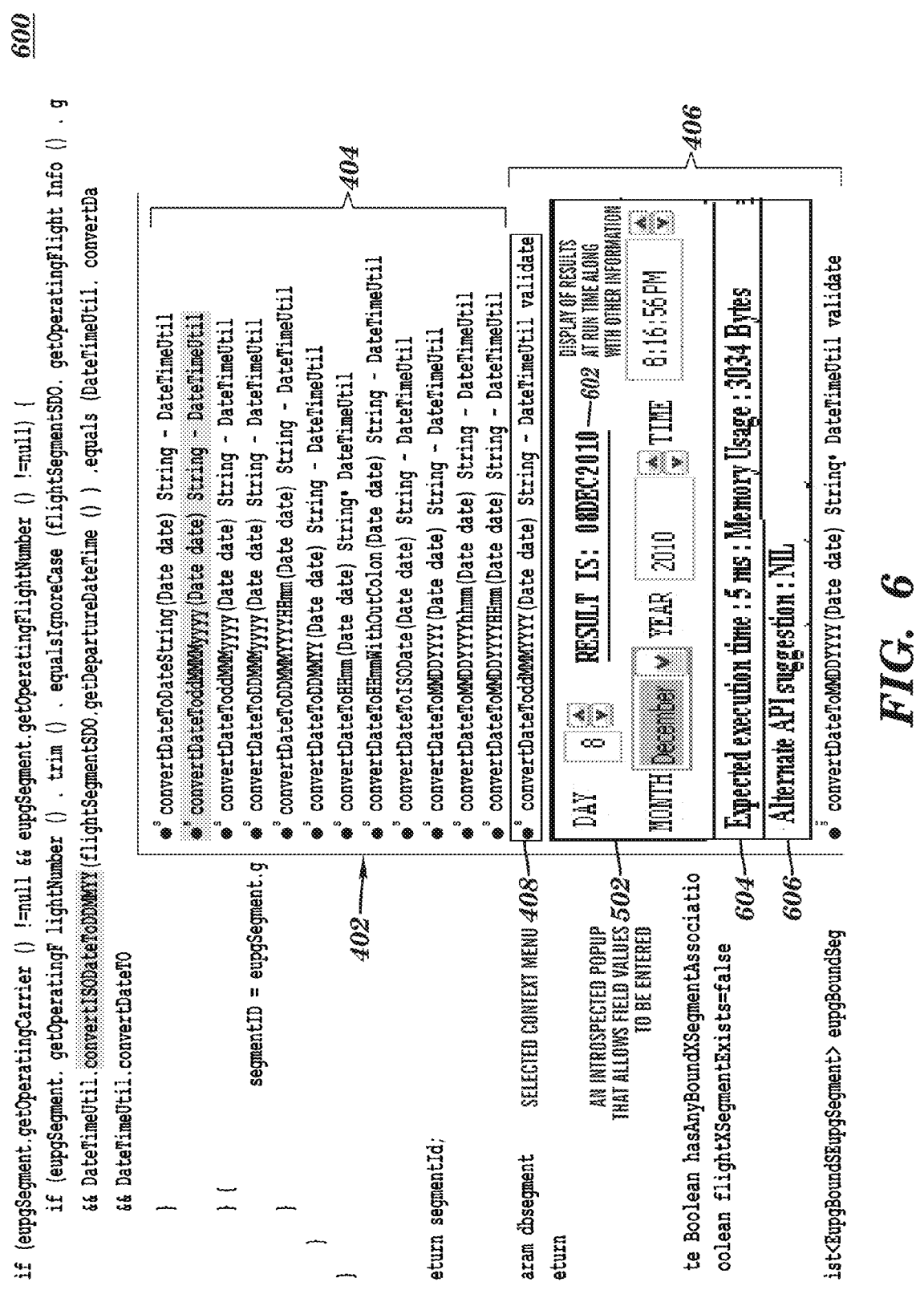

With reference to FIG. 6 a textual representation of a response for a self-contained function in accordance with one embodiment of the disclosure is presented. Code snippet 600 is a continuation of the example of code snippet 400 of FIG. 4. However code snippet 600 portrays result 602 for the selected method generated by content assist processor 306 of content assist system 300 of FIG. 3.

Code snippet 600 contains information previously described in the explanation of code snippet 400 and code snippet 500 with the addition of information comprising result 602. In the example, result 602 provides information in the form of the previous dialog of popup 502. Result 602 provides the actual result of executing the selected method.

However result 602 may also provide additional information comprising performance information 604 associated with the execution of the selected method. The performance information available is dependent upon the selected function and environment but typically includes values of expected execution time and memory footprint (i.e., memory usage). Optionally result 602 provides alternate method 606 providing the same result for the selected method subject to predetermined criteria. In an alternate embodiment, result 602 provides a list of methods in alternate method 606. The criteria for the list are determined using the respective function being validated and preferences 310 of FIG. 3.

Reporting of results accordingly varies as determined by the performance criteria for a respective function and interest of the user as well as existence of alternate functions having a same (or similar) capability and meeting predetermined performance criteria. For example, when memory usage is a key criterion, a ranking of alternate functions is presented according to the memory usage. The number of list elements may also be controlled by availability of alternate functions and limitation provided by the user. Typically when no alternate functions are available (or none meet the predetermined criteria) an entry of NIL is displayed.

In the example, result 602 is displayed using the same dialog as the previous dialog of popup 502. The result may re-use a previous dialog or may be displayed using another dialog or window as desired depending upon an indication in the preferences specified.

Figure 7:
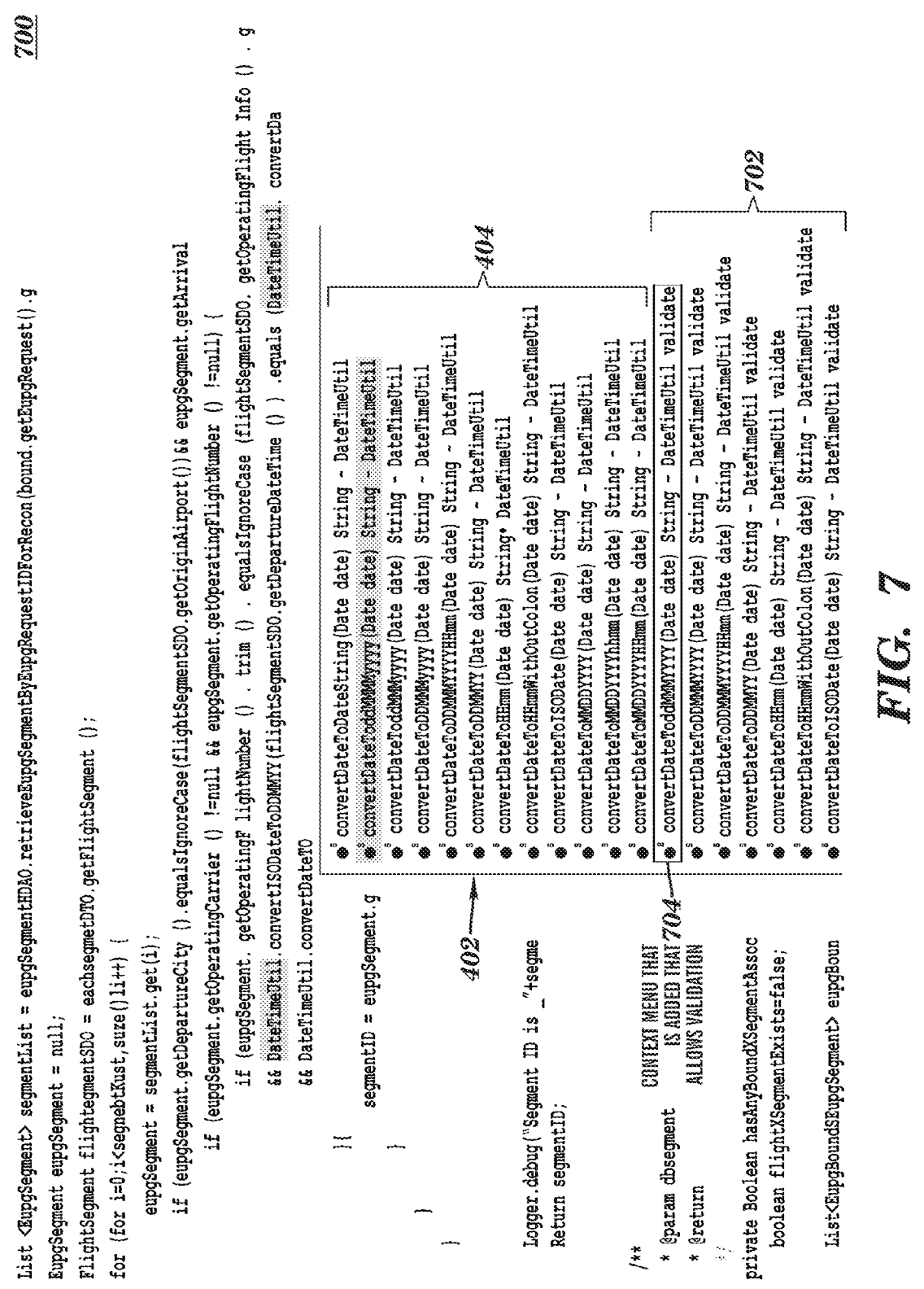

With reference to FIG. 7, a textual representation of a code snippet of a function requiring initialization in accordance with one embodiment of the disclosure is presented. Code snippet 700 is an example of using content assist system 300 of FIG. 3 in one embodiment. The function of the example requires initialization of global variables of an application-programming interface to execute the selected function under evaluation.

Code snippet 700 is an extension of the example of using a date and time utility portrayed in a dialog 402 exposing a set of methods 404. Each method in set of methods 404 is a regular method, which was implemented prior to enhanced content assist of content assist system 300. A set of enhanced methods 702 provides versions of corresponding methods of set of methods 404 which have been enhanced to include support for a validate operation in the form of context menu 704. A user selects a method for validation, such as a compareTo method, using the context menu.

The compareTo method requires comparing an input value to the value of a local variable (for example, Current date variable) for the method to be initialized. Accordingly validating using the enhanced content assist of content assist system 300 requires another step to be performed (in contrast with the previous example of FIG. 4) before a final expression is validated.

With reference to FIG. 8 a textual representation of entering a value for a function requiring initialization in accordance with one embodiment of the disclosure is presented. Code snippet 800 is a continuation of the example of code snippet 700 of FIG. 7.

Code snippet 800 contains the information previously described in the explanation of code snippet 700 with the addition of a dialog. Popup 502 provides a capability for the user to input required field values for the method of selected context 802 being validated. On selection of the method with validate option the developer is enabled to enter a value of the date object on the same dialog or a separate dialog. The input object, that is the date object, is identified through introspection, for example, Java reflection. The input values entered are used to validate the method and to yield a response instantly at programming time, as in real time. The dialog and values associated with the method vary with the needs of the function and method being validated.

Prompt 804 is presented to the user to solicit input field values for the method being validated. Prompt 804 may use the same dialog as popup 502 or a separate dialog depending upon an indication in the preferences specified. A prompt may solicit a value or a change to a default value provided. In an embodiment, a default value suffices enabling the function to be invoked in the background and thus provide a result in the dialog.

With reference to FIG. 9 a textual representation of entering a value for a function requiring initialization in accordance with one embodiment of the disclosure is presented. Code snippet 900 is a continuation of the example of code snippet 900 of FIG. 8, however code snippet 900 is used once initialization of global variables of an application-programming interface used to execute the selected function under evaluation is complete. Final input variable values are requested in a similar fashion.

In this case, the input object, that is the date object, is identified through introspection, for example, Java reflection. Input values 902 entered are used to validate the function and to generate a response in real time.

With reference to FIG. 10 a textual representation of a response for a function requiring initialization in accordance with one embodiment of the disclosure is presented. Code snippet 1000 is a continuation of the example of code snippet 900 of FIG. 9, however code snippet 1000 portrays result 1002 for the selected method generated by content assist processor 306 of content assist system 300 of FIG. 3.

Code snippet 1000 contains information previously described in the explanation of code snippet 700, code snippet 800 and code snippet 900 with the addition of information comprising result 1002. In the example, result 1002 provides information in the form of the previous dialog of popup 502. Result 1002 may simply provide the actual result of executing the selected method. However result 1002 may also provide additional information comprising performance information 1004 associated with the execution of the selected method. The performance information available is dependent upon the selected function and environment but typically includes values of expected execution time and memory usage. Optionally result 1002 provides alternate method 1006 providing the same result for the selected method subject to predetermined criteria.

In the example, result 1002 is displayed using the same dialog as the previous dialog of popup 502. The result may re-use a previous dialog or may be displayed using another dialog or window as desired. Reporting of results, as previously stated, accordingly varies as determined by the performance criteria for a respective function and interest of the user.

Figure 11:
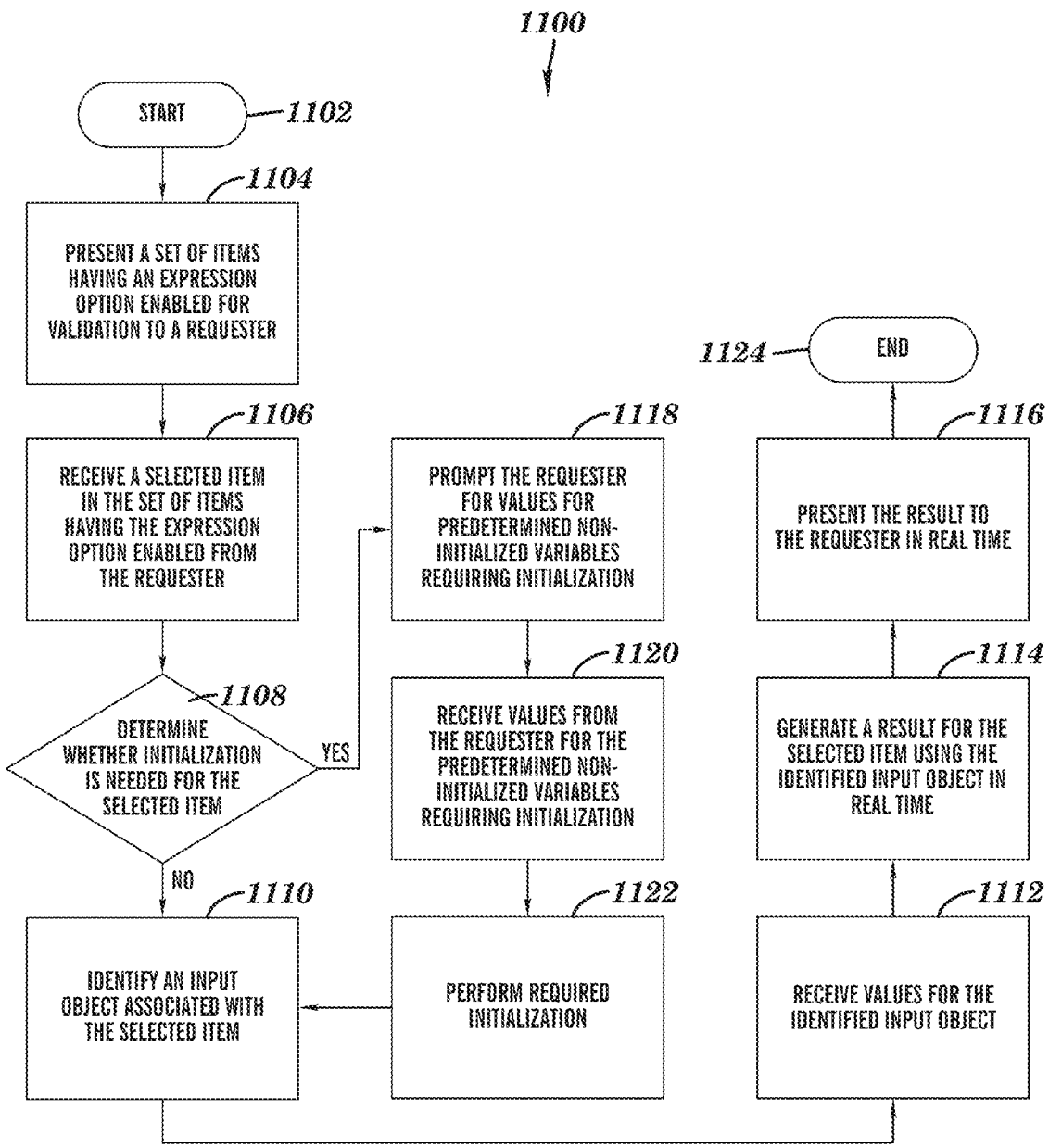
FIG. 11 is a flowchart of a process for validating an expression using the content assist system of FIG. 3 in accordance with one embodiment of the disclosure.

With reference to FIG. 11 a flowchart of a process for code validation using content assist in accordance with one embodiment of the disclosure is presented. Process 1100 is an example of a code validation process using content assist system 300 of FIG. 3 in an integrated development environment (IDE) of a computer system depicted in FIG. 1 and/or FIG. 2. The code assist is in operation throughout the performance of the process of FIG. 11.

Process 1100 begins (step 1102) and presents a set of items having an expression option enabled for validation to a requester (step 1104). The requester may be a code developer who is writing software code during operation of the content assist in the integrated development environment (IDE) of the computer system. The developer is enabled by the content assist to write the software code faster during the operation of the content assist than without the content assist. Each item may be a function or code method which generates a result upon being executed by one or more processors of the computer system. In one embodiment, the items may be methods that include support for a validate operation such as the enhanced methods 406 depicted in FIG. 4. Process 1100 receives, a selected item in the set of items having an expression option enabled for validation, from the requester (step 1106). An item in the set of items having an expression option enabled for validation has a corresponding item in a set of regular methods (not enabled for validation). The expression option, when selected, provides a capability to validate input values used in the expression, which is a method or function, by executing the method or function in step 1114 and presenting (e.g., displaying) the result of executing the method or function in step 1116.

The content assist afforded the selected item is based on the existing code structure of the item and does not add assistance from an external source such as a file or database. The content assist provides more than code completion, by providing a capability to test the selected item at time of selection rather than later when a program using the selected item is executed.

Process 1100 determines whether initialization is needed for the selected item (step 1108). Initialization refers to a need to perform initialization of global variables of an application-programming interface to execute the function of the selected item under evaluation. When a determination is made that initialization is not needed, process 1100 identifies an input object associated with the selected item (step 1110). A standalone function is an example in which initialization of global variables is not needed. In one example of identifying an input object the identification is made through introspection, for example, Java reflection.

When a determination is made that initialization is needed, process 1100 prompts the requester for values for predetermined non-initialized variables requiring initialization (step 1118). Process 1100 receives the values from the requester for the predetermined non-initialized variables requiring initialization (step 1120). The values received may be initial values from the requester or may be replacement values provided in place of previously supplied default values. Process 1100 performs the required initialization (step 1122) and returns to perform step 1110 as before (i.e., identifying the input object associated with the selected item).

Process 1100 receives values for the identified input object (step 1112). The values received may be initial values from the requester or may be replacement values provided in place of previously supplied default values, which may be at least one input value for execution of selected item.

Process 1100 generates a result of executing the selected item (i.e., selected method or function) by executing the selected item using the values of the identified input object in real time (step 1114).

Process 1100 presents the result (e.g., by displaying the result) of execution of the selected item to the requester in real time (step 1116) and terminates thereafter (step 1124). Presentation of the results using a user interface may comprise use of the same dialog used to obtain input values, a different dialog or view as needed.

Thus is presented, in an illustrative embodiment, a computer-implemented process for validating an expression which presents a set of items, in an integrated development environment wherein each item in the set of items having an expression option enabled for validation, to a requester, and receives a selected item in the set of items having an expression option enabled for validation from the requester. The computer-implemented process further determines whether initialization is needed for the selected item and responsive to a determination that initialization is not needed for the selected item, identifies an input object associated with the selected item, receives values for the identified input object, generates a result for the selected item using the received values for the identified input object in real time and presents the result to the requester in real time.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A process for code validation using content assist, said process comprising:
   presenting, by one or more processors of a data processing system, a first list of items to a code developer who is writing software code during operation of a content assist in an integrated development environment (IDE) of the data processing system, said developer enabled by the content assist to write the software code faster during the operation of the content assist than without the content assist, each item of the first list of items being enabled for validation, each item of the first list of items being a function or code method which generates a result upon being executed by the one or more processors;
   said one or more processors receiving, during the operation of the content assist, an item selected by the developer from the first list of items;
   said one or more processors generating, during the operation of the content assist, a result for the selected item by (i) executing the selected item using at least one value received as input from the developer during the operation of the content assist and (ii) ascertaining whether said executing the selected item requires prior initialization of a value of a variable; and
   said one or more processors displaying, during the operation of the content assist, the result to the developer.

2. The process of claim 1, said process further comprising:
   said one or more processors identifying, during the operation of the content assist, an input object associated with the selected item.

3. The process of claim 1, wherein said presenting further comprises presenting, to the code developer by the one or more processors, a second list of items simultaneously with the first set of items, and wherein each item of the second list of items corresponds to a respective item of the first list of items and differs from the respective item only by not being enabled for validation.

4. The process of claim 1, wherein said displaying further comprises displaying at least one performance characteristic, and wherein the at least one performance characteristic comprises an expected execution time for execution of the selected item, a memory usage needed by the selected item, or a combination thereof.

5. The process of claim 1, wherein said displaying further comprises displaying a list of alternate items ranked according to a performance characteristic, and wherein the performance characteristic is an expected execution time for the alternate items or a memory usage needed by the alternate items.

6. The process of claim 1, wherein said ascertaining comprises ascertaining that said executing the selected item does not require prior initialization of a value of a variable.

7. The process of claim 1, wherein said ascertaining comprises ascertaining that said executing the selected item requires prior initialization of a value of a variable, and wherein the method further comprises:
   after said ascertaining that said executing the selected item requires said prior initialization, said one or more processors receiving the value of the variable; and
   said one or more processors initializing the variable with the received value of the variable.

8. The process of claim 7, wherein the variable is a global variable of an application-programming interface used to execute the selected item.

9. The process of claim 7, wherein said receiving the value of the variable comprises receiving the value of the variable from the developer.

10. The process of claim 7, wherein said initializing comprises:
    receiving, from the developer, a validation method and an inputted value; and
    comparing the inputted value to a value of a local variable using the validation method.

11. A computer program product, comprising a computer readable hardware storage device having computer readable program code stored therein, said program, upon being executed by one or more processors of a data processing system, implements a process for code validation using content assist, said process comprising:
    presenting, by the one or more processors, a first list of items to a code developer who is writing software code during operation of a content assist in an integrated development environment (IDE) of the data processing system, said developer enabled by the content assist to write the software code faster during the operation of the content assist than without the content assist, each item of the first list of items being enabled for validation, each item of the first list of items being a function or code method which generates a result upon being executed by the one or more processors;

said one or more processors receiving, during the operation of the content assist, an item selected by the developer from the first list of items;

said one or more processors generating, during the operation of the content assist, a result for the selected item by (i) executing the selected item using at least one value received as input from the developer during the operation of the content assist and (ii) ascertaining whether said executing the selected item requires prior initialization of a value of a variable; and said one or more processors displaying, during the operation of the content assist, the result to the developer.

12. The computer program product of claim 11, said process further comprising:

said one or more processors identifying, during the operation of the content assist, an input object associated with the selected item.

13. The computer program product of claim 11, wherein said presenting further comprises presenting, to the code developer by the one or more processors, a second list of items simultaneously with the first set of items, and wherein each item of the second list of items corresponds to a respective item of the first list of items and differs from the respective item only by not being enabled for validation.

14. The computer program product of claim 11, wherein said displaying further comprises displaying at least one performance characteristic, and wherein the at least one performance characteristic comprises an expected execution time for execution of the selected item, a memory usage needed by the selected item, or a combination thereof.

15. The computer program product of claim 11, wherein said displaying further comprises displaying a list of alternate items ranked according to a performance characteristic, and wherein the performance characteristic is an expected execution time for the alternate items or a memory usage needed by the alternate items.

16. A data processing system comprising one or more processors, a memory, and a computer readable storage device, said storage device containing program code which, upon being executed by the one or more processors via the memory, implements a process for code validation using content assist, said process comprising:

presenting, by the one or more processors, a first list of items to a code developer who is writing software code during operation of a content assist in an integrated development environment (IDE) of the data processing system, said developer enabled by the content assist to write the software code faster during the operation of the content assist than without the content assist, each item of the first list of items being enabled for validation, each item of the first list of items being a function or code method which generates a result upon being executed by the one or more processors;

said one or more processors receiving, during the operation of the content assist, an item selected by the developer from the first list of items;

said one or more processors generating, during the operation of the content assist, a result for the selected item by (i) executing the selected item using at least one value received as input from the developer during the operation of the content assist and (ii) ascertaining whether said executing the selected item requires prior initialization of a value of a variable; and said one or more processors displaying, during the operation of the content assist, the result to the developer.

17. The data processing system of claim 16, said process further comprising:

said one or more processors identifying, during the operation of the content assist, an input object associated with the selected item.

18. The data processing system of claim 16, wherein said presenting further comprises presenting, to the code developer by the one or more processors, a second list of items simultaneously with the first set of items, and wherein each item of the second list of items corresponds to a respective item of the first list of items and differs from the respective item only by not being enabled for validation.

19. The data processing system of claim 16, wherein said displaying further comprises displaying at least one performance characteristic, and wherein the at least one performance characteristic comprises an expected execution time for execution of the selected item, a memory usage needed by the selected item, or a combination thereof.

20. The data processing system of claim 16, wherein said displaying further comprises displaying a list of alternate items ranked according to a performance characteristic, and wherein the performance characteristic is an expected execution time for the alternate items or a memory usage needed by the alternate items.

* * * * *